C. D. TABOR.
ELEVATING PIVOT FIXTURE FOR WINDOWS.
APPLICATION FILED AUG. 1, 1908.
1,001,322.
Patented Aug. 22, 1911.
5 SHEETS—SHEET 1.
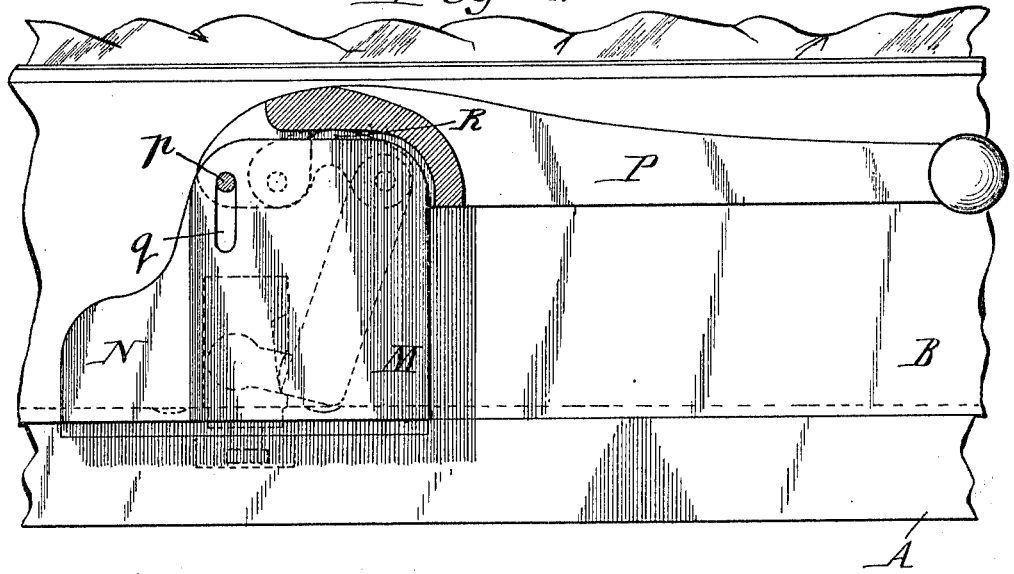
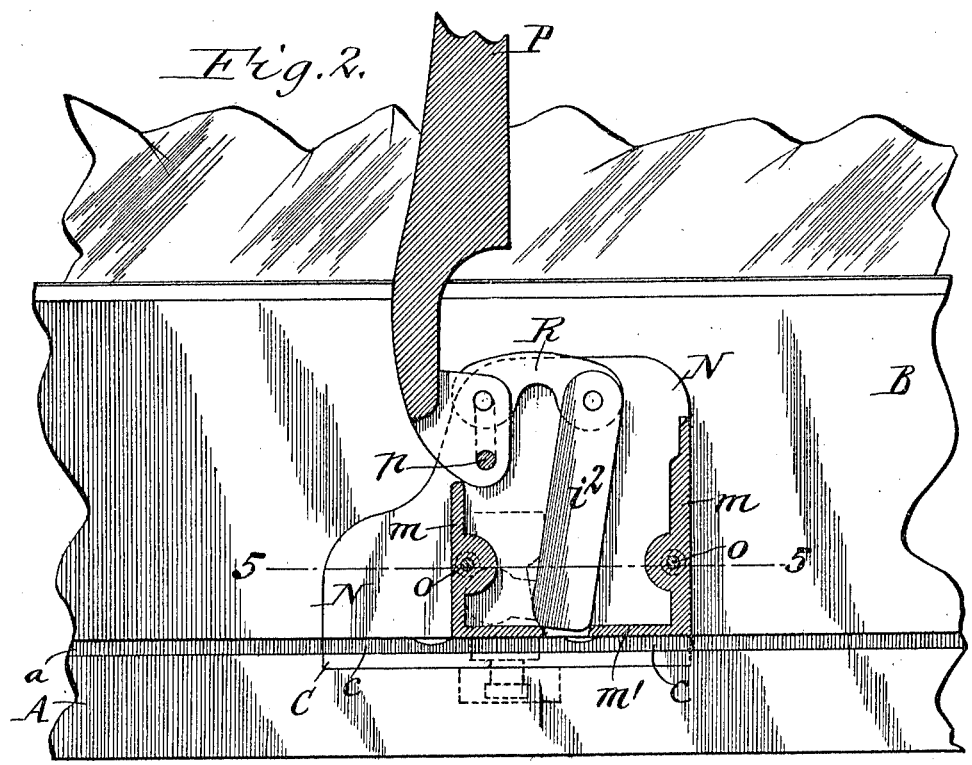

C. D. TABOR.
ELEVATING PIVOT FIXTURE FOR WINDOWS.
APPLICATION FILED AUG. 1, 1908.
1,001,322.
Patented Aug. 22, 1911.
5 SHEETS—SHEET 2.
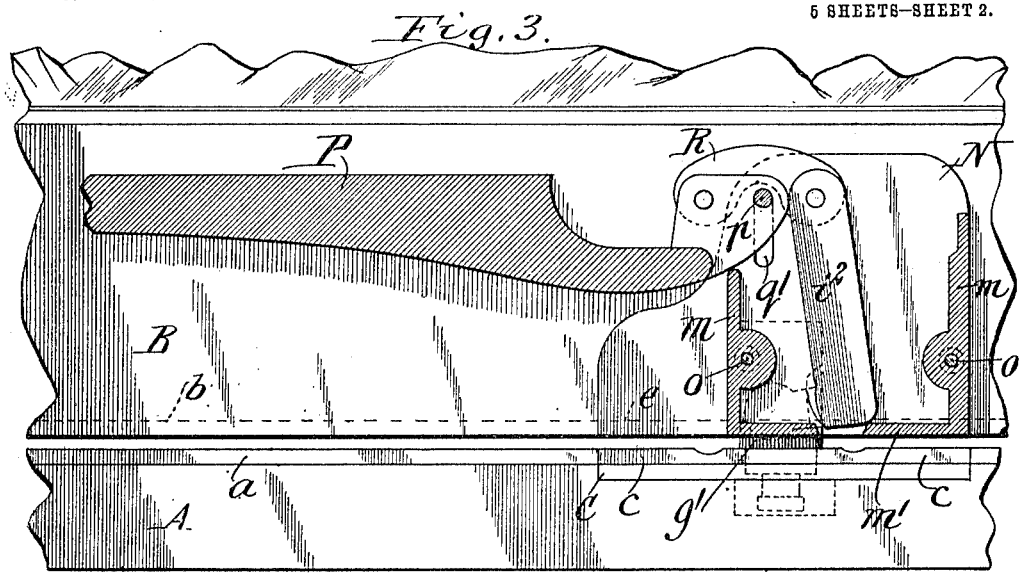
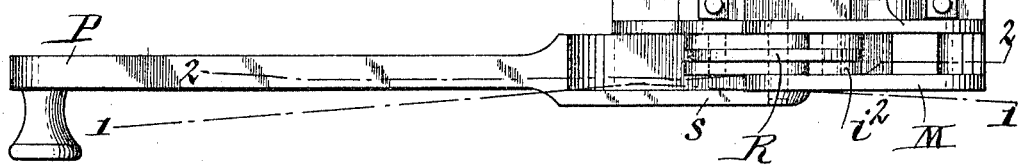
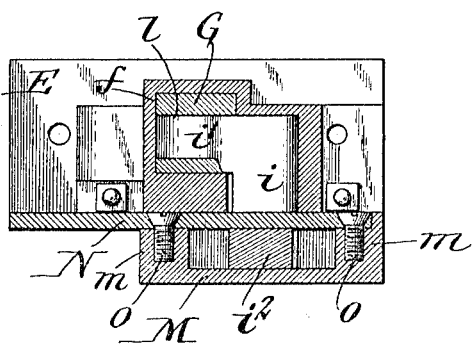

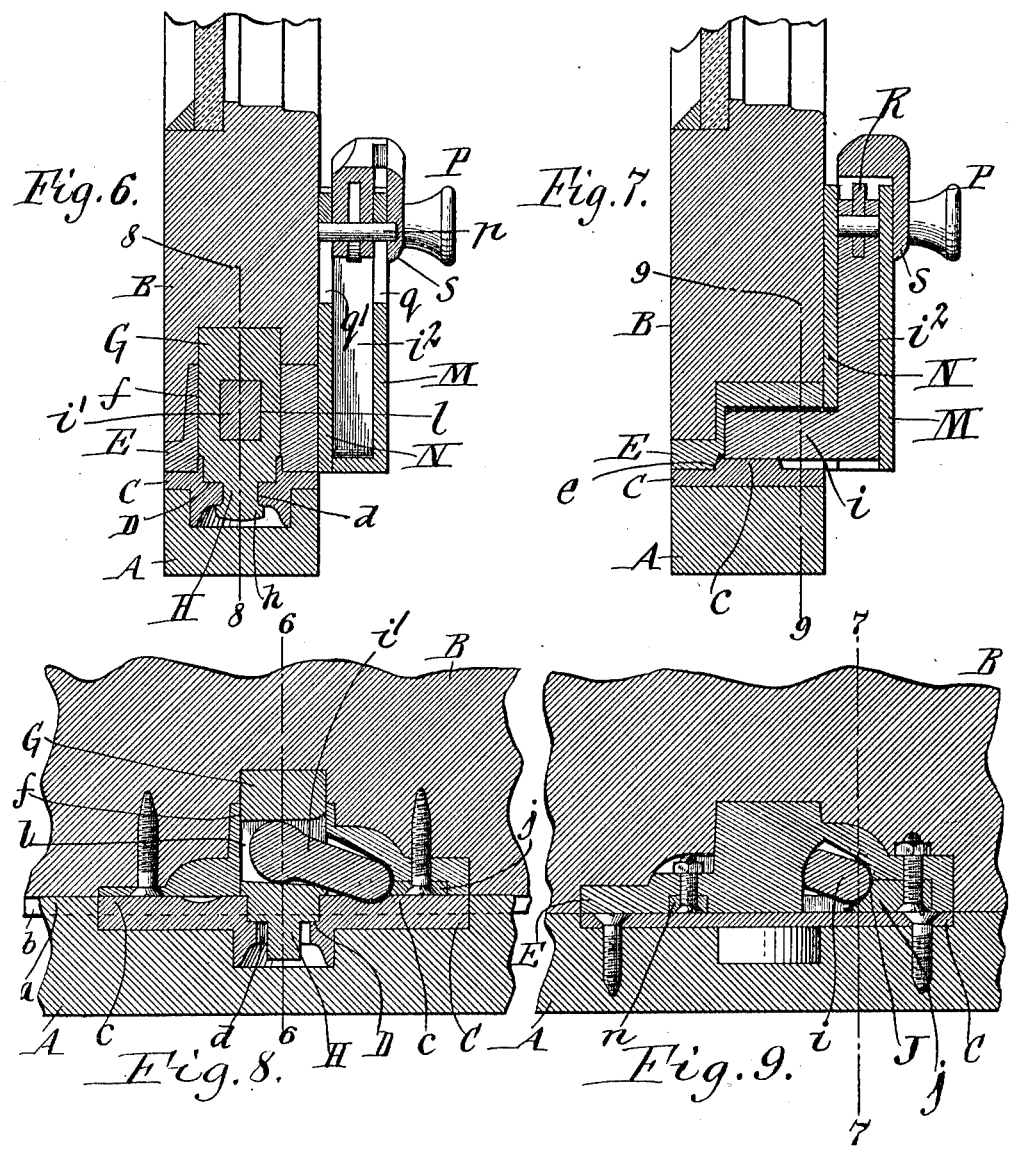

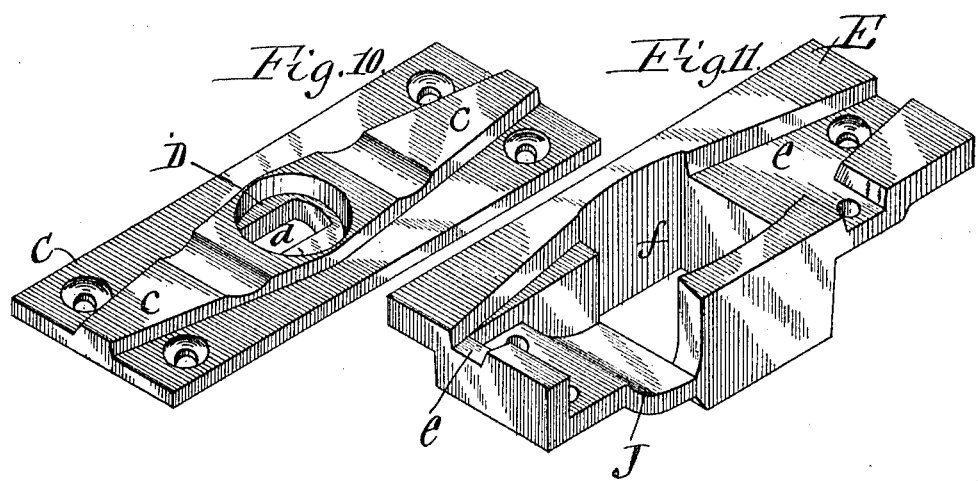
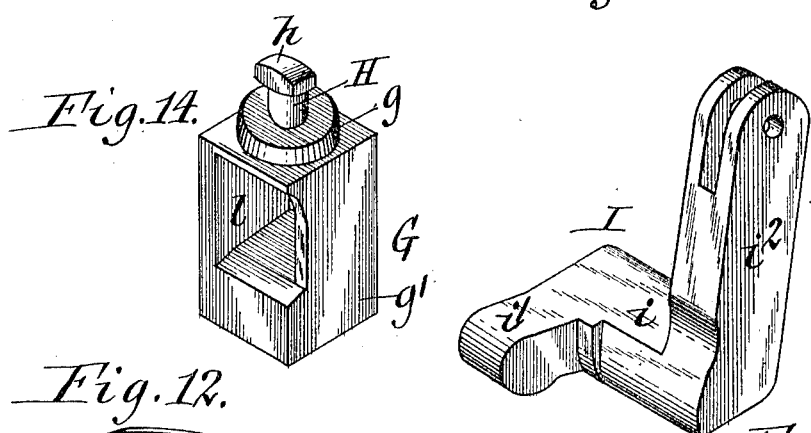
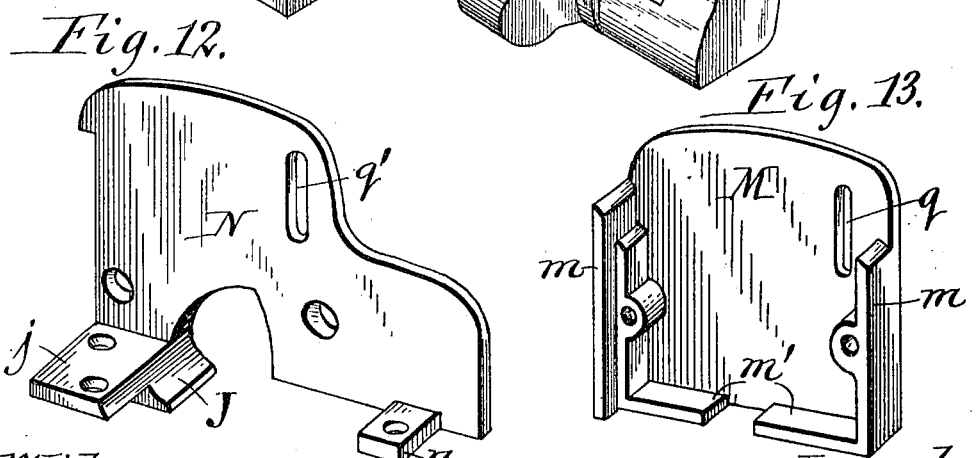

C. D. TABOR.
ELEVATING PIVOT FIXTURE FOR WINDOWS.
APPLICATION FILED AUG. 1, 1908.
1,001,322.
Patented Aug. 22, 1911.
5 SHEETS—SHEET 5.
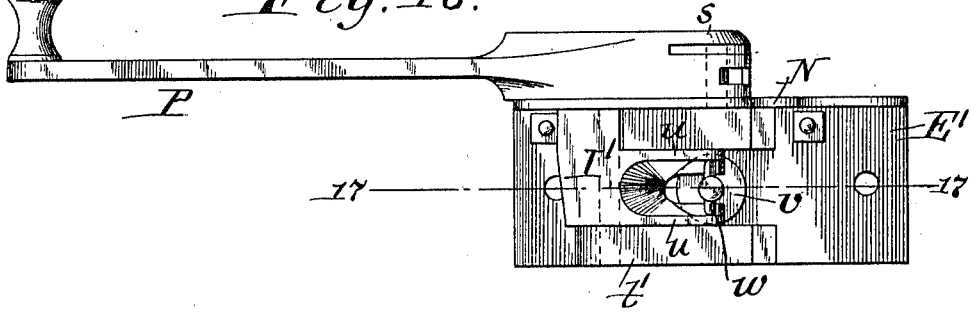
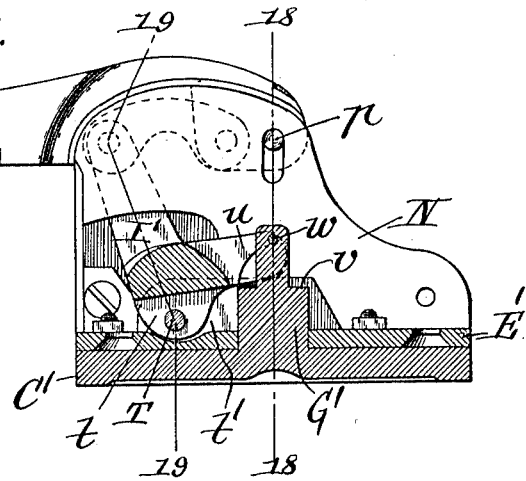
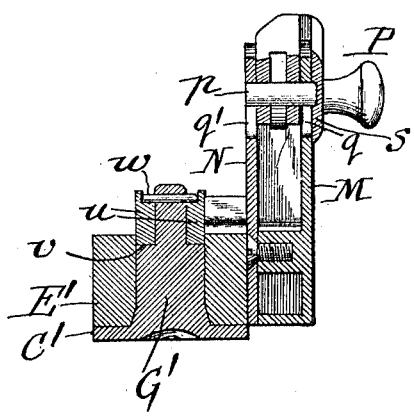
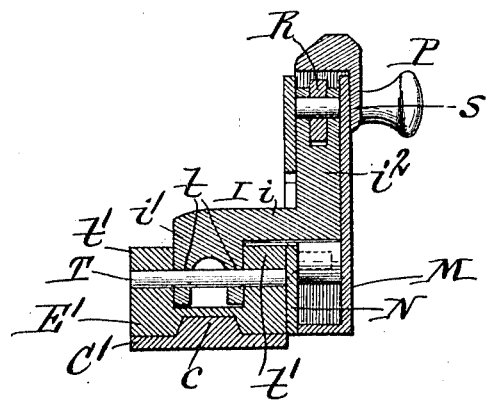

UNITED STATES PATENT OFFICE.

CLINTON D. TABOR, OF NEW DORP, NEW YORK, ASSIGNOR TO TABOR SASH COMPANY, OF NEWARK, NEW JERSEY, A CORPORATION OF NEW JERSEY.

ELEVATING PIVOT-FIXTURE FOR WINDOWS.

1,001,322.  Specification of Letters Patent.  Patented Aug. 22, 1911.

Application filed August 1, 1908. Serial No. 446,417.

*To all whom it may concern:*

Be it known that I, CLINTON D. TABOR, a citizen of the United States, and resident of New Dorp, in the county of Richmond and State of New York, have invented a new and useful Improvement in Elevating Pivot-Fixtures for Windows, of which the following is a specification.

This invention relates to an elevating pivot fixture which is more particularly designed for windows in which the sash is pivoted centrally at its upper and lower ends in the frame. In windows of this character the sash is movable vertically and the opposing lower parts of the sash and frame are provided with a coöperating rib and groove which engage with each other in the lowered position of the sash but which are disengaged in the raised position of the same and thus permit the latter to be swung horizontally into its opened and closed position.

The object of this invention is to produce an elevating pivot fixture for connecting the lower parts of the sash and frame which is comparatively simple in construction, which enables the sash to be raised and lowered uniformly and with the minimum of expenditure of power, and which operates to hold the sash centrally in its lowered and elevated position.

In the accompanying drawings consisting of 5 sheets: Figure 1 is a fragmentary vertical longitudinal section of my improved elevating pivot fixture taken in line 1—1, Fig. 4, and showing the parts in the position which they occupy when the sash is fully lowered. Fig. 2 is a similar view taken in line 2—2, Fig. 4, and showing the position of the parts when the sash is partly elevated. Fig. 3 is a sectional view taken on the same lines as Fig. 2 but showing the parts in the position which they occupy when the sash is fully raised. Fig. 4 is a top plan view of the elevating pivot fixture detached from the sash and frame. Fig. 5 is a horizontal section of the same taken in line 5—5, Fig. 2. Figs. 6 and 7 are vertical transverse sections, taken in lines 6—6 and 7—7, Figs. 8 and 9, respectively. Figs. 8 and 9 are fragmentary vertical longitudinal sections taken in lines 8—8 and 9—9, Figs. 6 and 7, respectively. Figs. 10, 11, 12, 13, 14 and 15 are perspective views of different parts of the elevating pivot fixture. Fig. 16 is a top plan view of a modified construction of my improved elevating pivot fixture. Fig. 17 is a vertical longitudinal section thereof in line 17—17, Fig. 16. Figs. 18 and 19 are vertical transverse sections taken in lines 18—18 and 19—19, Fig. 17.

Similar letters of reference indicate corresponding parts through the several views.

A represents the horizontal lower member or sill of the window frame and B the horizontal lower bar of the window sash. The sash is pivoted centrally at its upper and lower ends in the frame so as to be capable of turning horizontally in the same and also sliding vertically therein similar to the sash shown in a former window fixture invented by myself and patented February 28, 1905, No. 783,555. In windows of this character a tight joint is produced between the lower bar of the sash and the sill of the frame by means of a longitudinal rib *a* arranged on top of the sill and a longitudinal groove *b* arranged on the underside of the sash bar, said rib and groove being engaged with each other upon lowering the sash when the same are in line and said groove and rib being disengaged by raising the sash so as to permit of turning the latter horizontally into an opened or closed position.

My improved elevating pivot fixture which connects the lower bar of the sash and the sill of the frame is constructed as follows: C represents a frame face plate secured lengthwise in a recess in the upper side of the sill at the center thereof and provided centrally with a circular step bearing D which opens upwardly, an oblong opening *d* extending diametrically across said step bearing from the upper to the underside of the sill plate, and longitudinal ribs *c* arranged on opposite sides of the step bearing in line with the ribs of the sill so as to practically form extensions of the latter. To the underside of the sash bar is secured a sash face plate E which is provided with a longitudinal groove *e* forming an extension of the groove in the sash bar and adapted to receive the rib on the frame face plate in the lowered position of the sash. Arranged in a guide opening $f$ formed centrally in the sash face plate is an upright pivot pin or post G the lower end $g$ of which is circular or cylindrical and turns in the step bearing of the frame face plate while its upper part $g^1$ is flat sided so as to fit the opening $f$ in the sash plate, which is of corresponding form, and compel the sash plate and pivot pin to turn together but permitting the sash plate to slide vertically on the pivot pin independently of the latter. The underside of the pivot pin is provided with a depending neck H which has an elongated head $h$ at its lower end. This head may be passed through the elongated opening $d$ of the frame plate after bringing the head and opening in line with each other and when the head reaches the underside of the frame plate and the same is turned together with the pivot pin then these parts are interlocked and prevented from becoming separated. The relative arrangement of the oblong opening and head of the frame plate and pivot pin is such that these parts can only be assembled or dismembered while the sash plate is arranged at right angles to the frame plate, thereby preventing the sash pivot pin from being raised while the sash is swung into its closed position in line with the frame.

I represents an intermediate elbow shaped rock lever having a horizontal wrist or knuckle $i$, a lower rear or outer horizontal arm $i^1$ projecting laterally from one end of the knuckle and an upright front arm $i^2$ projecting upwardly from the opposite end of the knuckle. The latter is journaled transversely in a bearing J formed between the underside of the sash face plate and a bearing plate $j$ secured to the underside of the sash plate, as shown in Fig. 9. The lower outer arm of the elbow lever engages with a recess $l$ in the upper part of the pivot pin or post and its upper or inner arm is arranged within the front and rear walls M, N of a casing on the inner or front side of the lower sash bar. The rear wall N of this casing is preferably formed integrally with the bearing plate $j$ which latter is arranged at one end thereof and at its opposite end the same is provided with a lug $n$ which is secured to the underside of the sash face plate at the corresponding end thereof. The front wall M of the casing has formed integrally therewith the side walls $m$, $m$ and bottom $m^1$ of this casing and is secured to the rear wall by means of screws $o$, $o$, as shown in Figs. 5 and 13.

P represents a hand lever which has a sliding pivotal connection with the casing which is preferably effected by means of a horizontal transverse pivot pin $p$ passing through the inner end of this lever and through vertical slots $q$, $q^1$ arranged in the upper parts of the front and rear walls of the casing at a point transversely in line or nearly so with the pivot post. On one side and adjacent to its fulcrum the hand lever is connected by a link R with the upper end of the upright arm of the elbow lever. When the sash is in its lowered and closed position the hand lever projects substantially in a horizontal direction from the right of its pivot which at this time is at the upper end of the slots $q$, $q^1$, the elbow lever is turned with its upper arm toward the right, and the pivotal connection between the link and the hand lever is arranged between the fulcrum of the hand lever and the pivotal connections between the link and the upper arm of the elbow lever, so that these three pivots are horizontally in line or on a dead center, as shown in Fig. 1. While in this position any attempt to raise the sash from the outside is prevented owing to the link and hand lever at this time operating as a lock which prevents the elbow lever from turning and consequently renders it impossible to raise the sash by any power applied to the same directly from the interior or the exterior. When it is desired to elevate the sash the hand lever is turned upwardly and downwardly from its horizontal position at the right side of its pivot to a position in which it projects horizontally from the left side of its pivot. As the hand lever swings from its horizontal position at the right to its central position its pivot pin $p$ gradually slides from the upper ends of the slots $q$, $q^1$ of the casing, shown in Fig. 1, to the lower ends of the same, as shown in Fig. 2, and upon completing the movement of this lever from its central position to a position in which it is arranged at the left of its pivot, the pin $p$ slides from the lower ends of the slots $q$, $q^1$ to the upper ends thereof, as shown in Fig. 3. By this constant shifting of the pivot or fulcrum of the hand lever the pivotal connection between the latter and the link is maintained in the most favorable position relative to the elbow lever and link so as to obtain the greatest leverage from the beginning to the end of the stroke of this lever in moving from right to left, thereby enabling the sash to be raised with a minimum expenditure of hand power.

When the hand lever reaches its extreme position toward the left its pivot is arranged horizontally in line with and between the pivotal connections of the link with the hand lever and elbow lever, as shown in Fig. 3, whereby these pivots are arranged on a dead center relatively to each other and the sash is locked in its elevated position.

Upon turning the hand lever from left to right the pivot thereof first slides downwardly from the position at the top of the slots $q$, $q^1$ in the casing, as shown in Fig. 3, to the bottom of these slots, as shown in Fig. 2, and then rises again to the top of these slots, as shown in Fig. 1, thereby enabling the attendant to obtain a powerful leverage during the entire reverse movement of the hand lever and permitting the sash to be lowered gradually and slowly and avoiding the liability of the sash dropping suddenly which is particularly liable to occur and very objectionable in case of a very heavy sash.

The sliding pivot of the hand lever not only places the lever in the most advantageous position throughout its raising and lowering movements but it also equalizes the power necessary for raising and lowering the sash, thereby avoiding irregular action of the device which otherwise would occur if the hand lever turned about a fixed pivot. By thus locking the sash in its lowered and elevated positions as the pivot of the hand lever reaches the dead center relatively to the link and lever, no separate locking devices are required for this purpose, thereby reducing the cost of installing windows of this character.

In order to produce a finished appearance on the front side of the casing and also to provide an additional support for the pin $p$, the handle lever is provided with a flange $s$ which overhangs the upper part of the front wall of the casing and supports the pivot $p$ in such manner that it conceals the front end of this pin and also a considerable part of the slot $q$ in the front wall.

In the modified construction of my improved elevating pivot fixture the elbow lever $I^1$ is pivotally supported by means of a horizontal pin T passing transversely through lugs $t$ on the knuckle of this lever and through lugs $t^1$ on the upper side of the sash plate, the pivot pin or post $G^1$ is formed integrally with the frame plate $C^1$ and passes upwardly through a circular opening in the sash plate $E^1$ and the rear lower arm of the elbow lever is bifurcated and bears with the lower sides of its branches or fingers $u$, $u$ against an annular shoulder $v$ formed on the upper part of the pivot pin while the upper sides of these fingers engage with the underside of a cotter pin $w$ passing transversely through the upper end of the pivot pin. This means of connecting the elbow lever with the pivot pin permits the sash to turn relatively to the frame but couples the lever with the pivot pin so that the sash cannot be raised nor lowered except through the medium of the hand lever which operates in substantially the same manner as the construction first described.

I claim as my invention:

1. An elevating pivot fixture for windows comprising face plates adapted to be attached to the sash and frame, respectively, one of said plates having a pivot pin which is arranged in an opening in the other plate, an intermediate lever having one arm engaging said pivot pin, a hand lever having a movable fulcrum, and a link connecting said hand lever with the other arm of said intermediate lever, the relative arrangement of the parts being such that in one position of the lever its fulcrum is between pivotal connections of the link with the hand lever and with the intermediate lever and in another position the pivotal connection between the link and hand lever is arranged between the fulcrum of the hand lever and the pivotal connection of the link with the intermediate lever, said three pivotal connections being in line in each position of the hand lever.

2. An elevating pivot fixture for windows comprising face plates adapted to be attached to the sash and frame, respectively, one of said plates having a pivot pin which is arranged in an opening in the other plate, an intermediate elbow lever journaled on the plate with the opening and engaging one of its arms with said pin, a wall connected with the plate having said opening and provided adjacent to said pin with a vertical slot, a hand lever having its pivot slidable in said slot, and a link connecting said hand lever with the other arm of said elbow lever, the relative arrangement of the parts being such that in one position of the lever its fulcrum is between pivotal connections of the link with the hand lever and with the intermediate lever and in another position the pivotal connection between the link and hand lever is arranged between the fulcrum of the hand lever and the pivotal connection of the link with the intermediate lever, said three pivotal connections being in line in each position of the hand lever.

3. An elevating pivot fixture for windows comprising face plates adapted to be attached to the sash and frame, respectively, one of said plates having a pivot pin which is arranged in an opening in the other plate, a casing which is connected with the plate having said opening and which is provided in its front and rear walls with vertical slots adjacent to said pivot pin, an intermediate elbow lever journaled on the plate with said opening and having one of its arms engaging said pivot pin while its other arm is arranged in said casing, a hand lever having its pivot slidable vertically in said slots, and a link connecting said hand lever with the arm of the elbow lever which is within said casing, the relative arrangement of the parts being such that in one position of the lever its fulcrum is between pivotal connections of the link with the hand lever and with the intermediate lever and in another position the pivotal connection between the link and hand lever is arranged between the fulcrum of the hand lever and the pivotal connection of the link with the intermediate lever, said three pivotal connections being in line in each position of the hand lever.

Witness my hand this 27th day of July, 1908.

CLINTON D. TABOR.

Witnesses:
 A. SCHRAFFT,
 GEORGE RIPLEY.

Copies of this patent may be obtained for five cents each, by addressing the "Commissioner of Patents, Washington, D. C."